United States Patent [19]
Timmermans

[11] 3,770,045
[45] Nov. 6, 1973

[54] METHOD OF MAKING INTERNALLY LINED STEEL CYLINDERS

[76] Inventor: Franz D. Timmermans, Goethestr. 11a, Kiel, Germany

[22] Filed: Jan. 21, 1972

[21] Appl. No.: 217,366

Related U.S. Application Data

[63] Continuation-in-part of Ser. No. 767,589, Oct. 11, 1968, Pat. No. 3,651,109.

[52] U.S. Cl............................ 164/118, 29/149.5 DF
[51] Int. Cl............................................. B22d 13/00
[58] Field of Search....................... 164/73, 82, 118, 164/114

[56] References Cited
UNITED STATES PATENTS

| | | |
|---|---|---|
| 1,528,303 | 3/1925 | Rockwell............................ 164/114 |
| 1,549,124 | 8/1925 | Arens.................................. 164/118 |
| 1,662,592 | 3/1928 | Weitling et al. ................ 164/118 X |
| 1,831,310 | 11/1931 | Lindemuth..................... 164/114 X |

Primary Examiner—J. Spencer Overholser
Assistant Examiner—V. K. Rising
Attorney—Erwin Salzer

[57] ABSTRACT

A process for lining steel cylinders with a relatively soft bearing metal such as lead bronze. The lined steel cylinders are intended as a material for manufacturing bearings, or bearing half-shells. The lining process of the steel cylinders is automated and the cooling of the lined steel cylinders while still incandescent is effected by means of a melted metal having a relatively low melting point, operating as a cooling medium and reducing the temperature of the internally lined steel cylinders at a very rapid rate.

9 Claims, 2 Drawing Figures

PATENTED NOV 6 1973  3,770,045

METHOD OF MAKING INTERNALLY LINED STEEL CYLINDERS

BACKGROUND OF THE INVENTION

This is a continuation-in-part of my patent application Ser.No. 767,589, filed 10/11/68 now U.S. Pat No. 3,651,109 issued Apr. 4, 1972 for METHOD OF PRODUCING COMPOSITE BUSHINGS.

The above patent relates to a method of making composite bearings, i.e., bearings having a radially outer layer of steel and a radially inner layer of a specific bearing metal, such as lead bronze. The initial step in making the bearings consists in lining a steel cylinder having relatively large dimensions in comparison to the dimensions of the individual bearings or half-shells to be made with lead bronze, or a like bearing metal, by means of a centrifugal process. The length and the diameter of said steel cylinder exceed by far the length and the diameter of the individual bearings to be made. The wall thickness of the steel cylinder exceeds but slightly the thickness of a steel backing layer of the composite bearings, or bearing half-shells. Thereafter, the lined steel cylinder is cut in axial direction, or along a generatrix thereof, and flattened out so as to be substantially planar. This is achieved by means of a rolling operation. The lead-bronze-lined steel plate thus obtained is cut along generatrices of the original cylinder surface into a plurality of flat strips which are bent transversely to the original curvature of the steel cylinder to form half-shells of 180°.

The principal objects of the present invention are to automate the process of lining the steel cylinder with a bearing metal, such as lead bronze, and of greatly improving the microstructure of the lining layer of the steel cylinder.

SUMMARY OF THE INVENTION

During the internal lining process of the steel cylinder the temperature thereof is maintained substantially constant by sensing the radiant energy emitted by means of a temperature sensing device or pyrometer whose output controls a temperature regulator for the heater of the steel cylinder.

The temperature of the steel cylinder and its bearing lining which is initially at an incandescent level, or in excess of 1,000° C, is suddenly or rapidly reduced by using a liquefied metal having a relatively low melting point as cooling medium.

DESCRIPTION OF PREFERRED EMBODIMENT

Figure 1:
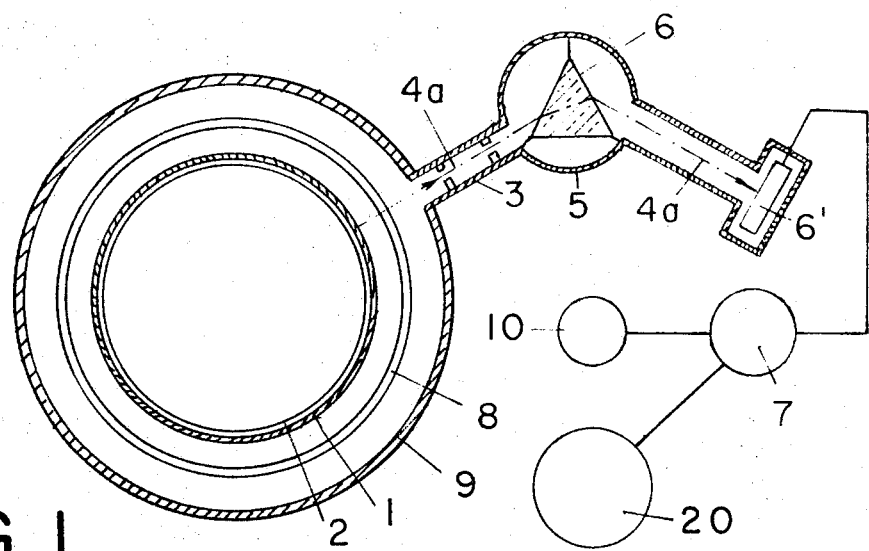
FIG. 1 is a diagrammatic transverse section of machinery intended to carry into effect the steel cylinder lining steps according to the present invention.

The process according to the present invention may be understood more readily by first considering machinery or equipment for carrying the same into effect. It will, however, be understood that for carrying into effect the process according to the present invention, machinery may be used that differs more or less from that diagrammatically shown in FIGS. 1 and 2.

Referring now to the drawings, reference character 1 has been applied to indicate a rotating cylinder of steel the inner surface of which is about to be lined with a layer 2 of a bearing metal, e.g., an alloy of lead and copper, or lead bronze. Cylinder 1 is surrounded by a coaxial heating coil or solenoid 8 energized by an electric current and heating steel cylinder 1 and lining 2 by induction. In other words, parts 1,2 are maintained at the desired, or required, temperature by induction heating. Cylinder 1, its lining 2, and induction heating coil 8, are arranged in a housing 9 which may be referred to hereinafter as the first housing. Housing 9, winding 8, and steel cylinder 1, are arranged in coaxial relation. Reference character 3 has been applied to generally indicate a housing for the radiation emitted from cylinder 1 and its lining 2 which is indicative of the temperature thereof. Housing 3 forms part of a pyrometer system including prism 6, prism support 5 and sensor 6' for radiant energy. Reference character 4a has been applied to generally indicate the path of a beam of radiant energy from parts 1 and 2 to sensor 6'. The output of sensor 6', e.g., that of a selenium cell, is fed into the regulator system 7 designed to maintain the temperature of parts 1,2 at a desired level, or within desired limits, by controlling the energization of heating coil 8. Such regulating systems are conventional and, therefore, do not need to be described in detail. The regulator system is set to maintain the desired temperature of parts 1,2 for a pre-set period of time, and to then automatically disconnects heating coil 8 from its supply of power. At the same time coil 8 and housing 9 are moved relative to parts 1,2 in axial direction, and parts 1,2 are inserted into another housing or cooling housing to which reference character 11 has been applied. It will be noted from FIG.2 that parts 1,2 are inserted into housing 11 in such a way as to establish and maintain a coaxial relation thereof with housing 11. Reference characters 10 and 20 have been applied to indicate two motors both under the control of regulating system 7. Motor 20 is part of the drive mechanism for rotating parts 1,2 while inside of housing 9 and induction heating coil 8. Motor 10 is part of the drive mechanism for separating parts 8,9 from parts 1,2 after the heat treatment of the latter in the former has been completed.

Figure 2:
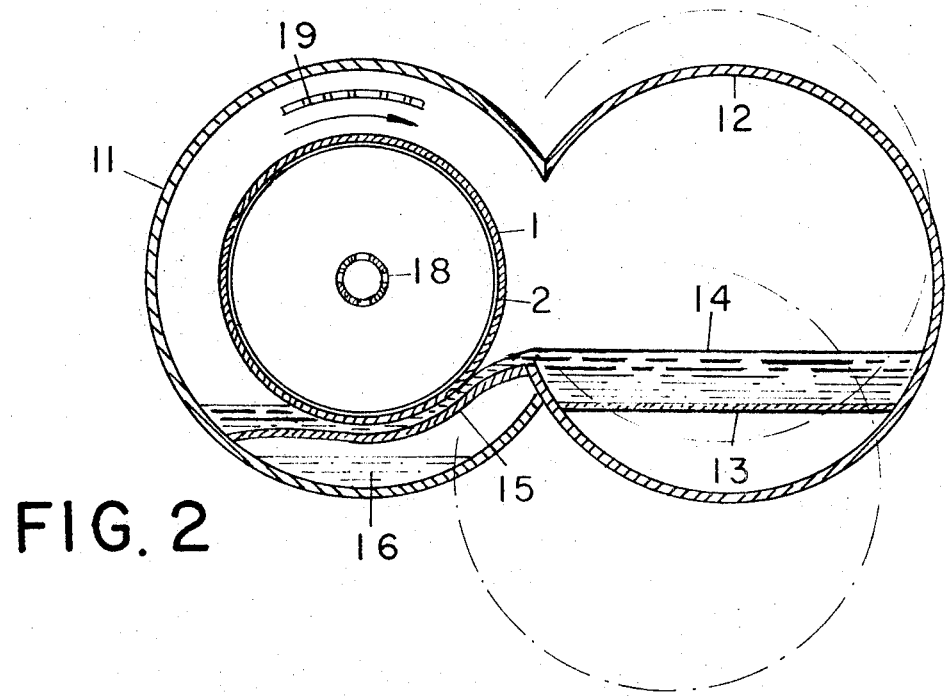
FIG. 2 is a diagrammatic transverse section of machinery intended to carry into effect the cylinder cooling steps according to the present invention.

Upon completion of the transfer of lined steel cylinder 1,2 from housing 9 into housing 11 the former is cooled in the latter by a cooling medium consisting of a liquefied metal 14 having a relatively low melting point. Cooling metal 14 is stored in liquid form in a container 12 integral with container 11 housing steel cylinder 1. Container 14 has a partition 13 supporting the body of cooling metal 14 in melted state. Lined steel cylinder 1 is subjected to rotation while inside of housing 11 about the common axis of both cylinder 1 and housing 11. A container 12 is adapted to be tilted to levels of different hight. FIG.2 shows in solid lines an intermediate level of container 12 and indicates in dotted lines two other possible levels thereof, namely a higher level and a lower level. If the level of container 12 is raised to the position shown in solid lines in FIG.2, the liquid cooling metal 14 flows from container 12 into container 11 and forms a jet impinging upon the outer surface of steel cylinder 1 which is rotating in clockwise direction, as seen in FIG.2, and as indicated in FIG.2 by a clockwise arrow. The metal 14 leaving container 12 is a jet which is substantially in the form of a sheet. This jet impinges upon the outer surface of steel cylinder 1 substantially along a generatrix of said cylinder. Container 12 is provided with a fluid guide or vane 15 a portion of which is coaxial with cylinder 1 and encompasses a fraction of the entire periphery of cylinder 1. Fluid guide or vane 15 keeps the cooling medium 14 in close engagement with a portion of the surface of cylinder 1. Upon having cooled cylinder 1 and its internal lining 2 cooling medium 14 collects in sump 16 formed by container 11. When the temperature of cylinder 1 and its internal lining 2 have been reduced to a desired level, the cooling medium 14 is withdrawn from sump 16 by lowering the level of container 12 relative to that of housing 11.

Upon removal of the metallic cooling medium from housing 11 the cylinder 1 and the lining 2 thereof must be further cooled down. This may be achieved with an aqueous cooling medium. The latter may be sprayed radially outwardly upon the lining 2 of cylinder 1 by axially extending spray means indicated at 18. As an alternative, an aqueous cooling medium may be introduced into container 11 through an aperture 19 in one of the end surfaces thereof in which case the aqueous cooling medium engages primarily the radially outer surface of steel cylinder 1. If an aqueous cooling medium is used for parts 1, 2 the presence of a protective gas atmosphere is required. The latter ought to be free from oxygen. Nitrogen and carbon dioxyde are suitable to form protective gas atmospheres. It is further necessary, or desirable, to remove the lead content from the vaporous atmosphere resulting from the cooling action of an aqueous cooling medium. This is particularly true if the aqueous cooling medium is allowed to come into physical contact with cylinder lining 2.

The significance of the above process steps and of the equipment for the performance thereof will become more apparent from what follows:

It will be apparent from the above that the automation of the lining process of the steel cylinder results in a substantial reduction of cost and a substantial increase of the uniformity of the product, i.e., of the physical characteristics of the lead-bronze-lined steel cylinders.

It is necessary to cool the steel cylinders 1 following completion of the lining operation by centrifugal casting at which time their temperature may be in the order of 1,000° C. Attempts have been made to achieve a drastic cooling action by using water or oil as cooling medium. The attempts to use water as cooling medium failed on account of what is known as Leidenfrost's phenomenon. This term refers to the fact that if a drop of aqueous liquid is placed on a hot metal plate, the drop floats upon the plate on jets of steam which have a very low thermal conductivity and tend to keep the drop proper from even reaching the boiling point thereof. The Leidenfrost phenomenon virtually precludes the use of aqueous cooling media where it is desirable to achieve a very rapid cooling action such as suddenly reducing the temperature of an internally lead-bronze-lined steel cylinder. Attempts to effect a sudden cooling action with oil as a cooling medium have failed on account of the relatively low thermal conductivity of oil. This is particularly true in regard to the case at hand.

An extremely rapid cooling action of the lead-bronze-lining 2 of steel cylinder 1 is required to maintain the micro structure of the former. Such a rapid cooling action may be achieved by using liquid metals having a relatively low melting point as cooling media in order to reduce the temperature of the lining 2 of the steel cylinder 1 rapidly to its solidifying point. Preferably the melting point of the liquid metallic cooling medium should be less than the melting point of lead. This condition may be met by various alloys of lead, and alloys of light metals. Even melted lead may effectively be used as a cooling medium for the lined steel cylinder 1,2. The higher the thermal conductivity of the melted metallic cooling medium, the grater its effectiveness in achieving the desired result. Certain alloys of aluminum combine the requirements of relatively high thermal conductivity and relatively low fusing point.

Upon initial sudden reduction of the temperature of lining 2 of steel cylinder 1 further cooling may be achieved by aqueous cooling media as set forth above. The steel cylinder 1 should preferably be lined with lead bronze at temperatures of 1,100° to 1,150° C. This temperature should be maintained for about 5 minutes. Then the incandescent lined cylinder 1,2 ought to be transferred into the cooling system of FIG.2. The cooling by an aqueous medium may be initiated upon solidification of the copper phase of the bronze, or upon cooling to the melting point of lead. An aqueous cooling medium may be vibrated by ultrasound for increased cooling efficiency.

Upon cooling of the lead-bronze-lined cylinder 1,2 to a relatively low temperature, the former is preferably to be treated as more fully disclosed in my copending U.S. Pat. application Ser.No.9,135, filed Jan.23,1970 for METHOD FOR PRODUCING COMPOSITE BUSHINGS AND BEARINGS.

I claim as my invention:

1. A process for lining cylinders of steel with a bearing metal including the steps
    a. of subjecting a cylinder of steel to a rotary motion about the axis thereof;
    b. lining the inner surface of said cylinder while rotating at an elevated temperature by centrifugal action with liquefied lead bronze;
    c. measuring the temperature of said lead bronze on said inner surface of said cylinder and automatically maintaining said temperature of said lead bronze for a period of time in the order of 5 minutes approximately at a temperature range of 1,100° to 1,150° C;
    d. thereafter subjecting the outer surface of said cylinder to the cooling action of a melted metal having a relatively low melting point while maintaining said rotary motion of said cylinder about the axis thereof; and
    e. thereafter cooling said cylinder to a lower temperature than said melting point of said low melting point metal.

2. A process as specified in claim 1 including the steps
    a. of maintaining said temperature at said predetermined range by controlling the current flow in an induction heating coil surrounding said cylinder;
    b. of establishing a relative motion between said cylinder and said heating coil in a direction longitudinally of said cylinder to separate said heating coil and said cylinder; and
    c. thereafter immersing a portion of the outer surface of said cylinder into said melted metal having a relatively low melting point.

3. A process as specified in claim 2 including the step of cooling said cylinder by means of an aqueous medium after subjecting the outer surface of said cylinder to said cooling action of said melted metal.

4. A process as specified in claim 3 including the step of subjecting the inner lining of said cylinder to the action of an aqueous medium in the presence of a protective gas.

5. A process as specified in claim 1 including the steps of projecting a flat elongated jet of said melted metal having a relatively low melting point against the outer surface of said cylinder imparting to said jet substantially the shape of a sheet and thereby causing said jet to impinge upon the outer surface of said cylinder substantially along a generatrix of said cylinder.

6. A process as specified in claim 1 including the steps of
 a. subjecting said cylinder to a rotary motion while maintaining said cylinder inside of an energized induction heating coil;
 b. preparing said relatively low melting point metal in a container in melted state for treatment of said outer surface of said cylinder;
 c. separating said cylinder from said induction heating coil;
 d. transferring said relatively low melting point metal from said container upon the surface of said cylinder by increasing the level of said container relative to the level of said cylinder; and
 e. thereafter retransferring said relatively low melting point metal back to said container by reducing the level of said container relative to the level of said cylinder.

7. A process as specified in claim 1 including the steps of
 a. subjecting said cylinder to a rotary motion inside of a first housing and raising the temperature thereof to incandescence while rotating in said first housing;
 b. transferring said cylinder from said first housing into a second housing and rotating said cylinder in said second housing about the axis of said cylinder; and
 c. projecting a flat elongated jet of said melted metal having a relatively low melting point against the outer surface of said cylinder while rotating inside of said second housing.

8. A process as specified in claim 7 including the steps of draining from said second housing said melted metal having a relatively low melting point, and thereafter admitting an aqueous cooling medium to said second housing.

9. A process as specified in claim 8 including the step of admitting to said second housing both a protective gas and an aqueous cooling medium.

* * * * *